(12) United States Patent
Liu et al.

(10) Patent No.: US 10,508,938 B2
(45) Date of Patent: Dec. 17, 2019

(54) FIBER OPTICAL FABRY-PEROT FLOW TEST DEVICE AND TEST METHOD WITH LOCAL BENDING DIVERSION STRUCTURE

(71) Applicant: Tianjin University, Tianjin (CN)

(72) Inventors: Tiegen Liu, Tianjin (CN); Junfeng Jiang, Tianjin (CN); Huijia Yang, Tianjin (CN); Kun Liu, Tianjin (CN); Shuang Wang, Tianjin (CN); Weihang Zhang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/559,429

(22) PCT Filed: Oct. 27, 2016

(86) PCT No.: PCT/CN2016/103523
§ 371 (c)(1),
(2) Date: Sep. 19, 2017

(87) PCT Pub. No.: WO2017/219569
PCT Pub. Date: Dec. 28, 2017

(65) Prior Publication Data
US 2019/0120672 A1    Apr. 25, 2019

(30) Foreign Application Priority Data
Jun. 20, 2016    (CN) .......................... 2016 1 0463425

(51) Int. Cl.
*G01F 1/66* (2006.01)
*G01F 1/38* (2006.01)

(52) U.S. Cl.
CPC ................ *G01F 1/661* (2013.01); *G01F 1/38* (2013.01)

(58) Field of Classification Search
None
See application file for complete search history.

(56) References Cited

U.S. PATENT DOCUMENTS

| | | | | |
|---|---|---|---|---|
| 6,016,702 A | * | 1/2000 | Maron | G01L 9/0039 73/705 |
| 6,748,813 B1 | * | 6/2004 | Barger | G01F 1/8409 73/861.354 |
| 6,959,604 B2 | * | 11/2005 | Bryant | E21B 47/06 73/705 |
| 2003/0137669 A1 | * | 7/2003 | Rollins | G01B 11/2441 356/479 |
| 2006/0169058 A1 | * | 8/2006 | Gysling | G01F 1/7082 73/861.355 |
| 2011/0170823 A1 | * | 7/2011 | Xia | G01D 5/35303 385/12 |
| 2014/0176959 A1 | * | 6/2014 | Liu | G01B 9/0209 356/479 |
| 2014/0260588 A1 | * | 9/2014 | Jaaskelainen | E21B 47/123 73/152.32 |

* cited by examiner

*Primary Examiner* — Harshad R Patel
(74) *Attorney, Agent, or Firm* — George G. Wang; Bei & Ocean

(57) ABSTRACT

Fiber optical Fabry-Perot flow test device with local bending diversion structure, having an inlet flange, a test tube and an outlet flange, with both a fiber optical Fabry-Perot pressure sensor at high-pressure-side and a fiber optical Fabry-Perot pressure sensor at low-pressure-side, which are fixedly connected to the test tube through an auxiliary connecting device.

7 Claims, 3 Drawing Sheets

FIBER OPTICAL FABRY-PEROT FLOW TEST DEVICE AND TEST METHOD WITH LOCAL BENDING DIVERSION STRUCTURE

TECHNICAL FIELD

The present invention relates to a device and method thereof, and in particular to a fiber optical Fabry-Perot flow test device and method with a local bending diversion structure.

BACKGROUND OF THE PRESENT INVENTION

In the current industrial production area, there are many flow test situations. Flow test methods mainly focus on conventional methods such as turbine flow test, vortex flow test, pressure-type flow test by using a Venturi tube, and electromagnetic flow test. With the development of the fiber optical sensing technology and the diversity of flow test environments, in order to implement flow tests in harsh environments such as an antimagnetic environment, an anti-explosion environment or a high-temperature and high-pressure environment, there have been many researches on flow test methods based on the fiber optical sensing technology at present in consideration of the good anti-magnetism, anti-explosion and anti-interference performance of the fiber optical sensing methods.

Zhang Wentao et al. disclosed a flowmeter based on fiber optical dynamometry (Chinese patent application No. 201210464779.3), wherein fluid in a main pipe is guided to a branched test pipe through a diversion structure at a certain flow rate, and then transferred to a fiber optical sensing structure through a dynamometry diaphragm device for flow tests. Li Tianshi et al. disclosed an underground fiber optical flow sensor in an oil field (Chinese patent application No. 201310174087.X), which is packaged by a high-pressure-resistant diaphragm made of stainless steel and realizes flow tests by testing the path difference caused by pressure.

Hua Xia et al. disclosed a fiber optical sensing system in a harsh environment (Patent No. US2011/0170823A1), wherein an optical sensor consists of a periodic or quasi-periodic microcrystalline or silicon dioxide tetrahedral structure and a cladding layer adapted to a fiber optical core. Mikko J et al. disclosed a fiber optical system for monitoring flow (Patent No. US2014/0260588A1), wherein a sensor device is disposed at a head end of a drill rod, and a small flow test is realized by a double-fiber bragg grating.

Although the fiber bragg grating (hereinafter referred to as FBG) sensing technology may realize flow tests, it will be cross impacted by temperature due to high temperature sensitivity. Therefore, how to solve the problems in the existing fiber optical flow test technologies, such as the temperature cross-sensitivity impact on flow tests in high-temperature and high-pressure environments, has become an important research interests in the current fiber optical flow test technology.

SUMMARY OF THE PRESENT INVENTION

The present invention aims to overcome the deficiencies in the prior art and provides a fiber optical Fabry-Perot flow test device and method with local bending diversion structure. The fiber optical flow test device simplifies the structure by not probing a sensing structure into a pipe, solves the problem of temperature cross-sensitivity impacting on pressure-type flow tests on the basis of the demodulation of an fiber optical Fabry-Perot pressure sensor synchronously to an absolute phase difference, and improves the accuracy of flow tests.

The objective of the present invention is realized by the following technical solutions.

The present invention provides a fiber optical Fabry-Perot flow test device with local bending diversion structure, consisting of a main body, wherein the main body comprises an inlet flange, a test tube and an outlet flange which are successively connected from left to right, the test tube having linear ends and an arc-shaped middle portion; a fiber optical Fabry-Perot pressure sensor at high-pressure-side and a fiber optical Fabry-Perot pressure sensor at low-pressure-side, which are respective arranged with an optical transmission fiber internally and are communicated with the test tube, being provided on upper and lower sides of an arc-shaped wall in the middle portion of the test tube along the symmetric axis thereof; and the fiber optical Fabry-Perot pressure sensor at high-pressure-side is connected to a first circulator which is connected to a first light source and a first optical signal demodulation system, and the first optical signal demodulation system is connected to a first linear array CCD camera, and the fiber optical Fabry-Perot pressure sensor at low-pressure-side is connected to a second circulator which is connected to a second light source and a second optical signal demodulation system, the second optical signal demodulation system is connected to a second linear array CCD camera, both an output terminal of the first linear array CCD camera and an output terminal of the second linear array CCD camera are connected to an input terminal of a signal conditioning and acquisition circuit, and an output terminal of the signal conditioning and acquisition circuit is connected to a data processing unit.

Both the fiber optical Fabry-Perot pressure sensor at high-pressure-side and the fiber optical Fabry-Perot pressure sensor at low-pressure-side are fixedly connected to the test tube through an auxiliary connecting device which is designed as a hollow cylinder, and the auxiliary connecting device includes a fixed connection structure, a sealing structure and a gland packing layer, which are successively arranged from outside to inside.

Both the fiber optical Fabry-Perot pressure sensor at high-pressure-side and the fiber optical Fabry-Perot pressure sensor at low-pressure-side are packaged by laser welding, and for those sensors, a Fabry-Perot cavity is formed from monocrystalline silicon wafers and glass sheets having etched pits thereon.

The arc-shaped section in the middle portion of the test tube has an angle of bending ranging from 30° to 360° and a curvature-to-diameter ratio ranging from 1.1 to 2.5.

The length of the linear sections at two ends of the test tube is designed to be 5 to 10 times of the diameter of a pipe to be tested.

The objective of the present invention may also be realized by the following technical solutions.

A test method performed by using a fiber optical Fabry-Perot flow test device with local bending diversion structure is provided, including the following steps of:

(1) connecting the fiber optical Fabry-Perot flow test device with local bending diversion structure to a pipe to be tested, turning on a first light source and a second light source, and allowing a fluid to form a high pressure concentrated area and a low pressure concentrated area on an outer side and an inner side of the arc-shaped section when flowing through the arc-shaped section in the middle portion of the test tube;

(2) sensing a high pressure signal and a low pressure signal in the arc-shaped section in the middle portion of the test tube by the fiber optical Fabry-Perot pressure sensor at high-pressure-side and the fiber optical Fabry-Perot pressure sensor at low-pressure-side, respectively, the high pressure signal and the low pressure signal directly acting on the diaphragms of the fiber optical Fabry-Perot pressure sensor at high-pressure-side and the fiber optical Fabry-Perot pressure sensor at low-pressure-side, respectively, so that the length of each Fabry-Perot cavity changes, both high pressure information and low pressure information being implied in the optical path difference in the respective reflected light signal variations;

(3) transmitting the reflected light signal at high pressure side into the first optical signal demodulation system through the first circulator, transmitting the reflected light signal at low pressure side into a second optical signal demodulation system through a second circulator, and demodulating the reflected light signals containing different optical path difference information into spatial low-coherence interference patterns by a first optical signal demodulation system and a second optical signal demodulation system, respectively;

(4) receiving the spatial low-coherence interference pattern from the first optical signal demodulation system by the first linear array CCD camera, and converting the pattern into a high-pressure-side electrical signal, and receiving the spatial low-coherence interference pattern from the second optical signal demodulation system by the second linear array CCD camera, and converting the pattern into a low-pressure-side electrical signal; and (5) transmitting the high-pressure-side electrical signal and the low-pressure-side electrical signal to a data processing unit through a signal conditioning and acquisition circuit; calculating an absolute phase difference $\Delta\alpha_s$ between the high pressure side and the low pressure side, and then calculating an absolute pressure difference $\Delta P$ between the high pressure side and the low pressure side according to the formula $$\Delta P = \Delta\alpha_s \frac{16El^3}{3\left(\frac{D}{2}\right)^4 (1-v^2)} \left(\frac{1}{-2k_s}\right);$$

wherein, E is an elastic modulus of the diaphragm material, D is the diameter of the diaphragm, l is the thickness of the diaphragm, v is a Poisson's ratio and $k_s$ is the wave number at a point s; and finally, calculating a fluid flow Q in the pipe to be tested according to a forced vortex theory $$Q = \frac{8 \cdot \beta \pi A^2}{D^2} \sqrt{\frac{El^3 R}{-3Ak_s\rho(1-v^2)}} \Delta\alpha_s ,$$

wherein, $\beta$ is a correction factor, R is the curvature radius of the arc-shaped section in the middle portion of the test tube, A is the inner diameter of the arc-shaped section in the middle portion of the test tube, and $\rho$ is the fluid density.

Compared with the prior art, the technical solutions of the present invention have the following beneficial effects:

(1) the test tube of the present invention has an arc-shaped middle portion, and a fiber optical Fabry-Perot pressure sensor at the high-pressure-side and a fiber optical Fabry-Perot pressure sensor at the low-pressure-side, which are both communicated with the test tube, are provided on upper and lower sides of an arc-shaped wall so that, the present invention avoids probing the sensor into the test tube, and eliminates the disturbing influence of the test tube on a flow field;

(2) both the fiber optical Fabry-Perot pressure sensor at the high-pressure-side and the fiber optical Fabry-Perot pressure sensor at the low-pressure-side are packed by laser welding and are of a differential pressure asymmetric double-sensor structure, so that the present invention effectively reduces the test errors resulted from the temperature cross-sensitivity in a high-temperature environment; and (3) since the flow of fluid inside a pipe is calculated by using an absolute phase difference between a high pressure side and a low pressure side, the present invention avoids the cross-sensitivity of temperature and pressure algorithmically, and improves the text accuracy of the flow of fluid inside the pipe.

DETAILED DESCRIPTION OF THE PRESENT INVENTION

The present invention will be further described below with reference to the accompanying drawings.

Figure 1:
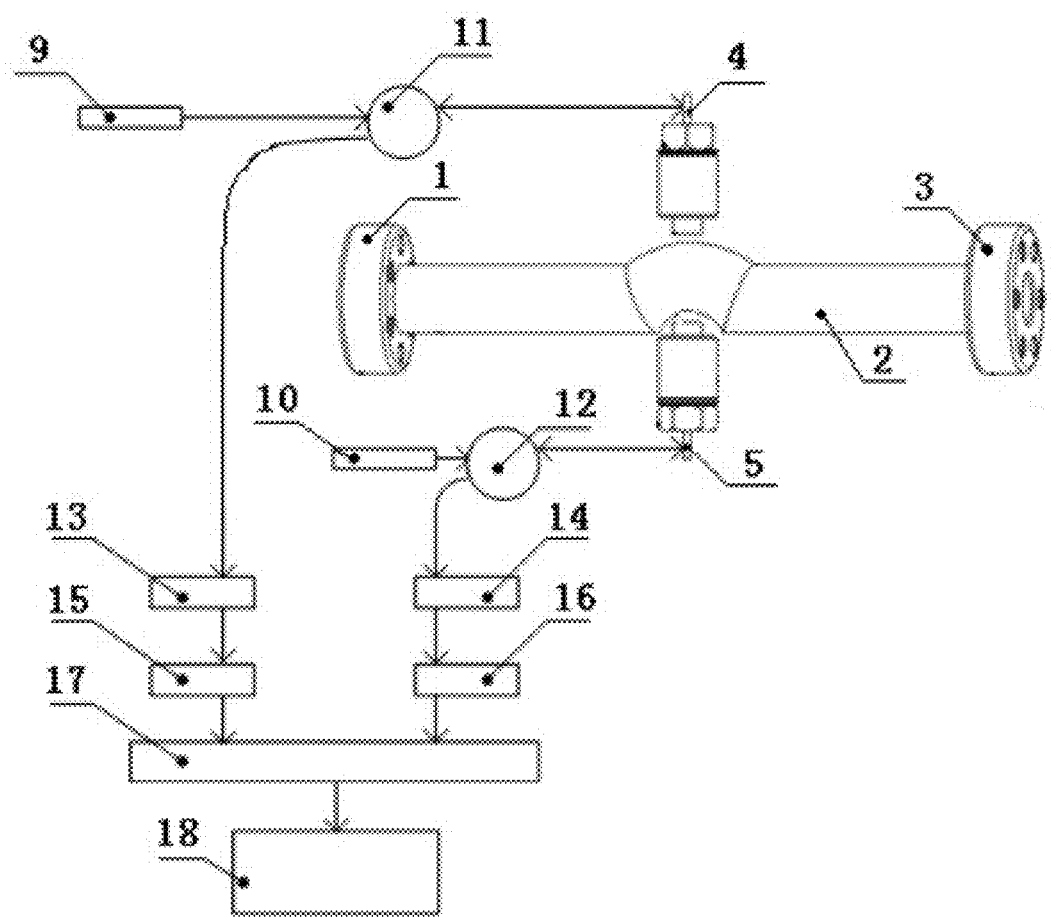
FIG. 1 is a structural diagram of the present invention.
Figure 2:
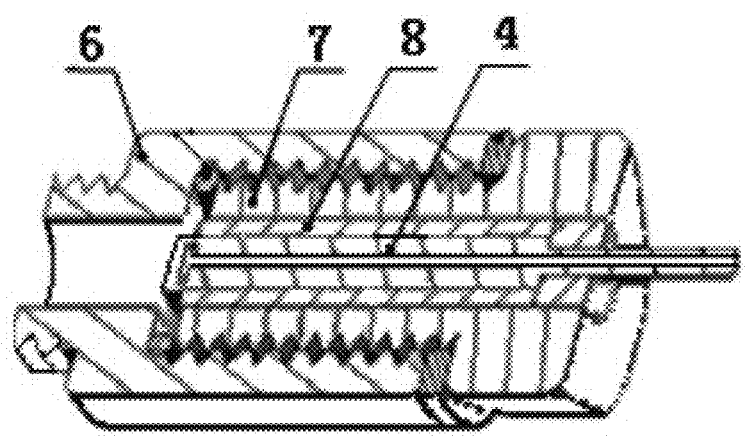
FIG. 2 is a sectional view of a fixed connection structure for integrally sealing a fiber optical Fabry-Perot pressure sensor at the high-pressure-side.
Figure 3:
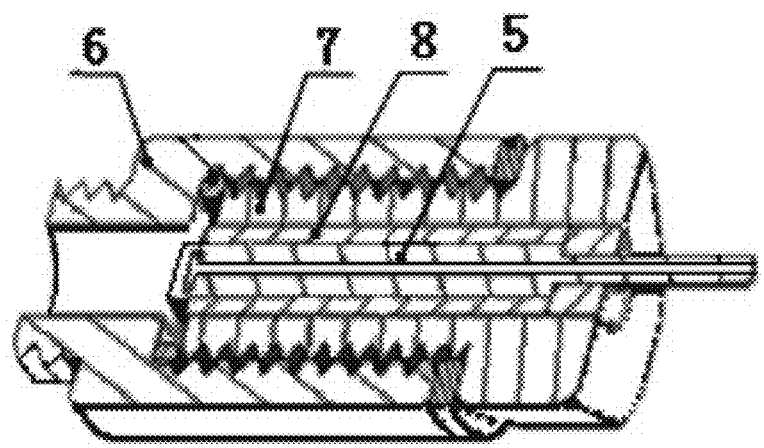
FIG. 3 is a sectional view of a fixed connection structure for integrally sealing a fiber optical Fabry-Perot pressure sensor at the low-pressure-side;
Wherein, 1: inlet flange; 2: test tube; 3: outlet flange; 4: fiber optical Fabry-Perot pressure sensor at high-pressure-side; 5: fiber optical Fabry-Perot pressure sensor at low-pressure-side; 6: fixed connection structure; 7: sealing structure; 8: gland packing layer; 9: first light source; 10: second light source; 11: first circulator; 12: second circulator; 13: first optical signal demodulation system; 14: second optical signal demodulation system; 15: first linear array CCD camera; 16: second linear array CCD camera; 17: signal conditioning and acquisition circuit; and, 18: data processing unit.

As shown in FIGS. 1 and 3, the present invention provides a fiber optical Fabry-Perot flow test device with local bending diversion structure, consisting of a main body, wherein the main body comprises an inlet flange 1, a test tube 2 and an outlet flange 3 which are successively connected from left to right; both the inlet flange 1 and the outlet flange 3 are used for connecting a pipe to be tested; and the test tube 2 has linear ends and an arc-shaped middle portion. The length of the linear sections at two ends of the test tube 2 is designed to be 5 to 10 times of the diameter of a pipe to be tested. The arc-shaped section in the middle portion of the test tube 2 has an angle of bending ranging from 30° to 360°, preferably 90°. The curvature-to-diameter ratio, namely, the ratio of the radius of central line of the arc-shaped section to the inner diameter of the test tube 2, is designed to range from 1.1 to 2.5, preferably 1.44. A fiber optical Fabry-Perot pressure sensor at high-pressure-side 4 and a fiber optical Fabry-Perot pressure sensor at low-pressure-side 5 are provided on upper and lower sides of an arc-shaped wall in the middle portion of the test tube 2 along its symmetric axis, and the fiber optical Fabry-Perot pressure sensor at high-pressure-side 4 and the fiber optical Fabry- Perot pressure sensor at low-pressure-side 5 are respectively arranged with an optical transmission fiber internally and are communicated with the test tube 2. End faces of the fiber optical Fabry-Perot pressure sensor at high-pressure-side 4 and the fiber optical Fabry-Perot pressure sensor at low-pressure-side 5 are close to the inner wall of the arc-shaped section but do not probe into the arc-shaped section of the test tube. The optical transmission fiber is not limited to a multi mode fiber, and may further include a large-core fiber optical, a monomode fiber optical or the like. The optical transmission fiber, which is used for transmitting an optical signal, including incident light and emergent light, is fixedly connected to a fiber optical Fabry-Perot pressure sensor, and realizes the connection of the fiber optical Fabry-Perot pressure sensor with a light source and a signal processing system through a connecting flange.

Due to the fiber optical Fabry-Perot pressure sensor at high-pressure-side 4 and the fiber optical Fabry-Perot pressure sensor at low-pressure-side 5 are packaged by laser welding instead of the conventional adhesive sealing, the deformation at a high temperature during adhesive sealing is avoided; and the sensors adopt monocrystalline silicon wafers and glass sheets having etched pits thereon to form the Fabry-Perot cavity. Wherein, the monocrystalline silicon wafers form the pressure sensing diaphragm, and the initial length of the Fabry-Perot cavity formed by the depth of the micro-pits on the high-temperature-resistant glass sheets ranges from 100 µm to 300 µm; the fiber optical Fabry-Perot pressure sensor at high-pressure-side 4 and the fiber optical Fabry-Perot pressure sensor at low-pressure-side 5 each have a diameter ranging from 1 mm to 10 mm and a length ranging from 5 mm to 40 mm.

Both the fiber optical Fabry-Perot pressure sensor at high-pressure-side 4 and the fiber optical Fabry-Perot pressure sensor at low-pressure-side 5 are fixedly connected to the test tube 2 through an auxiliary connecting device which is designed as a hollow cylinder, and the auxiliary connecting device includes a hollow fixed connection structure 6 and a sealing structure 7, which are successively arranged from outside to inside. The fiber optical Fabry-Perot pressure sensor at high-pressure-side 4 or the fiber optical Fabry-Perot pressure sensor at low-pressure-side 5 is provided inside the sealing structure 7. A high-temperature-resistant gland packing layer 8 is provided between the fiber optical Fabry-Perot pressure sensor at high-pressure-side 4 and the sealing structure 7, an extra O-shaped ring and a pad may also be added to enhance sealing. A gland packing layer 8 is provided between the fiber optical Fabry-Perot pressure sensor at low-pressure-side 5 and the sealing structure 7. The sealing structure 7, which is made of high-strength stainless material, is in thread connection with the fixed connection structure 6, and the bottom of the sealing structure 7 may provide with a limiting platform for controlling the fiber optical Fabry-Perot pressure sensor at high-pressure-side 4 and the fiber optical Fabry-Perot pressure sensor at low-pressure-side 5 to get close to the inner wall of the test tube 2 but not probe into it.

The fiber optical Fabry-Perot pressure sensor at high-pressure-side 4 is connected to a first circulator 11 which is connected to a first light source 9 and a first optical signal demodulation system 13. The first optical signal demodulation system 13 is connected to a first linear array CCD camera 15. The fiber optical Fabry-Perot pressure sensor at low-pressure-side 5 is connected to a second circulator 12 which is connected to a second light source 10 and a second optical signal demodulation system 14. The second optical signal demodulation system 14 is connected to a second linear array CCD camera 16. Both output terminals of the first linear array CCD camera 15 and the second linear array CCD camera 16 are connected to an input terminal of a signal conditioning and acquisition circuit 17, and an output terminal of the signal conditioning and acquisition circuit 17 is connected to a data processing unit 18. Both the first light source 9 and the second light source 10 are broadband light sources. Each of the first optical signal demodulation system 13 and the second optical signal demodulation system 14 includes an optical cylindrical collimating lens, an optical polarizer, an optical wedge, a polarization analyzer, a demodulated signal output interface and the like, which are successively arranged along the optical path. The optical cylindrical collimating lens calibrates a reflected signal from the fiber optical Fabry-Perot pressure sensor, and allows the reflected signal to be vertically input into the optical polarizer as far as possible. The optical polarizer separates ordinary ray O-ray from extraordinary ray E-ray in the optical signal, so as to extract polarized light. The optical wedge realizes an equal thickness interference function for the optical signal, and realizes the equivalent conversion of spatial low-coherence interference signals. The polarization analyzer realizes the superposition of interference signals to obtain a signal with maximum interference intensity. The demodulated signal output interface is an output interface for optical demodulated signals, and is in sealed contact with the linear array CCD camera to prevent the interference input of natural light. The signal conditioning and acquisition circuit 17 acquires and extracts multichannel CCD electrical signals and then transmits the acquired signals to the subsequent data processing unit 18. The type of the signal conditioning and acquisition circuit 17 includes but is not limited to: an embedded multichannel high-frequency data acquisition apparatus and a NIUSB-series data acquisition card (e.g., Series 6210, 6341, 6361, etc.).

A test method performed by using the fiber optical Fabry-Perot flow test device with local bending diversion structure includes the following steps:

Firstly, the fiber optical Fabry-Perot flow test device with local bending diversion structure is connected to a pipe to be tested; a first light source 9 and a second light source 10 are turned on, and the emitted light passes through a first circulator 11 and a second circulator 12 and then enters into the Fabry-Perot cavity of the fiber optical Fabry-Perot pressure sensor at high-pressure-side 4 and the Fabry-Perot cavity of the fiber optical Fabry-Perot pressure sensor at low-pressure-side 5. When the fluid flows through the arc-shaped section in the middle portion of the test tube 2 at a certain flow rate, the pressure applied on the test tube 2 changes due to the centrifugal movement of the fluid to form a high pressure concentrated area and a low pressure concentrated area on an outer side and an inner side at a ½ corner of the test tube 2 respectively, and a pressure difference corresponding to the flow rate is also generated;

Secondly, the fiber optical Fabry-Perot pressure sensor at high-pressure-side 4 and the fiber optical Fabry-Perot pressure sensor at low-pressure-side 5 sense the high pressure signal and the low pressure signal in the arc-shaped section in the middle portion of the test tube 2, respectively; the high pressure signal and the low pressure signal directly act on the diaphragms of the fiber optical Fabry-Perot pressure sensor at high-pressure-side 4 and the fiber optical Fabry-Perot pressure sensor at low-pressure-side 5, respectively, so that the length of each Fabry-Perot cavity changes and accordingly makes the reflected light deviated. As a result, the deviation of the reflected light changes the optical path difference constantly, and ultimately the high pressure information and low pressure information are implied in the optical path difference in the respective reflected light signal variations.

Thirdly, the reflected light signal at the high pressure side is input into a first optical signal demodulation system 13 through the first circulator 11, the reflected light signal at the low pressure side is input into a second optical signal demodulation system 14 through the second circulator 12, and the first optical signal demodulation system 13 and the second optical signal demodulation system 14 demodulate the reflected light signals containing different optical path difference information into spatial low-coherence interference patterns, respectively.

The first linear array CCD camera 15 receives the spatial low-coherence interference pattern from the first optical signal demodulation system 13 and then converts it into a high-pressure-side electrical signal, and the second linear array CCD camera 16 receives the spatial low-coherence interference pattern from the second optical signal demodulation system 14 and converts it into a low-pressure-side electrical signal.

Both the high-pressure-side electrical signal and the low-pressure-side electrical signal are transmitted to the data processing unit 18 (e.g. an embedded system, an industrial PC) through the signal conditioning and acquisition circuit 17, so as to realize signal processing and display or the like.

In order to obtain the absolute phases on the high pressure side and the low pressure side on the basis of the spatial low-coherence interference theory, a relative phase φ(l) and interference order m at a wave point s are required to be solved.

The absolute phase at the point s is calculated according to the following formula:

$$\varphi(s) = \arctan\{Im(P(s))/Re(P(s))\} - 2m\pi \quad (1)$$

Wherein, P(s) is a frequency domain value of a converted low-coherence interference signal fft, m is the interference order calculated after the fft conversion, and arctan{Im(P(s))/Re(P(s))} refers to the relative phase φ(l) at the point s.

The absolute phase at the high pressure side is calculated according to the following formula:

$$\varphi_h(s) = \varphi_h(l) - 2m_h\pi \quad (2)$$

The absolute phase at the low pressure side is calculated according to the following formula:

$$\varphi_l(s) = \varphi_l(l) - 2m_l\pi \quad (3)$$

Wherein, φ_h(l) is the relative phase at the high pressure side, φ_l(l) is the relative phase at the low pressure side, $m_h$ is the interference order at the high pressure side, and $m_l$ is the interference order at the low pressure side. After the value of the relative phase at the point s at the high pressure side and the value of the relative phase at the point s at the low pressure side converted by FFT, the phase value of each corresponding to the value of the center frequency (first-order frequency at the maximum energy after removing the DC component) is approximate to 0; that is to say, the converted values of the relative phase at the high pressure side and at the low pressure side are 0.

Therefore, the simplified calculation formula for the absolute phase difference between the high pressure side and the low pressure side is obtained as:

$$\Delta\alpha_s = \varphi_h(s) - \varphi_l(s) = 2\pi(m_l - m_h) \quad (4)$$

The relationship between the absolute pressure difference and the absolute phase difference is expressed by:

$$\Delta P = \Delta\alpha_s \frac{16El^3}{3\left(\frac{D}{2}\right)^4 (1-v^2)} \left(\frac{1}{-2k_s}\right) \quad (5)$$

Wherein, E is an elastic modulus of the diaphragm material, D is the diameter of the diaphragm, l is the thickness of the diaphragm, v is a Poisson's ratio and $k_s$ is the wave number at the point s.

In accordance with the forced vortex theory in the hydro-mechanics, the relationship between the fluid flow and the absolute phase difference between the high pressure side and the low pressure side may be expressed by:

$$Q = \beta\pi A^2 \sqrt{\frac{R}{2A}} \cdot \sqrt{\frac{\Delta P}{\rho}} \quad (6)$$

$$= \beta\pi A^2 \sqrt{\frac{R}{2A}} \cdot \sqrt{\frac{16El^3}{-6k_s\left(\frac{D}{2}\right)^4 \rho(1-v^2)} \Delta\alpha_s}$$

$$= \frac{8 \cdot \beta\pi A^2}{D^2} \sqrt{\frac{El^3 R}{-3Ak_s\rho(1-v^2)} \Delta\alpha_s}$$

Wherein, Q is the fluid flow, β is a correction factor, R is the curvature radius of the arc-shaped section in the middle portion of the test tube, A is the inner diameter of the arc-shaped section in the middle portion of the test tube, and ρ is the fluid density.

Thus, the flow of fluid in the pipe to be tested can be calculated by the above calculation. Since the pressure test points at the high pressure side and the lower pressure side are on a same circumferential cross-section, and the temperature distribution fields at the two points are approximately the same according to the equipotentiality of the local fluid temperature field distribution of the pipe, the micro change in length of the fiber optical Fabry-Perot cavity at the high pressure side and the low pressure side resulting by the change in temperature are same, so that the absolute phase of the reflected light contains an equal temperature strain component. Therefore, adopting first processing the difference between the absolute phases obtained by tests at the high pressure side and the low pressure side can further eliminate the temperature cross-sensitivity in an equal temperature field, and can improve the accuracy of flow tests ultimately.

Although the functions and working processes of the present invention have been described above with reference to the accompanying drawings, the present invention is not limited thereto. The foregoing specific implementations are merely illustrative but not limiting. A person of ordinary skill in the art may make various forms under the teaching of the present invention without departing from the purpose of the present invention and the protection scope of the appended claims, and all the forms shall fall into the protection scope of the present invention.

What is claimed is:

1. A fiber optical Fabry-Perot flow test device with local bending diversion structure, consisting of a main body, wherein the main body comprises an inlet flange, a test tube and an outlet flange which are successively connected from left to right, the test tube having linear ends and an arc-shaped middle portion, a fiber optical Fabry-Perot pressure sensor with a diaphragm provided at high-pressure-side and a fiber optical Fabry-Perot pressure sensor with a diaphragm provided at low-pressure-side, which are respectively arranged with an optical transmission fiber internally and are communicated with the test tube, being provided on upper and lower sides of an arc-shaped wall in the middle portion of the test tube along the symmetric axis thereof; and the fiber optical Fabry-Perot pressure sensor at high-pressure-side is connected to a first circulator which is connected to a first light source and a first optical signal demodulation system, and the first optical signal demodulation system is connected to a first linear array CCD camera, and the fiber optical Fabry-Perot pressure sensor at low-pressure-side is connected to a second circulator which is connected to a second light source and a second optical signal demodulation system, the second optical signal demodulation system is connected to a second linear array CCD camera, both an output terminal of the first linear array CCD camera and an output terminal of the second linear array CCD camera are connected to an input terminal of a signal conditioning and acquisition circuit, and an output terminal of the signal conditioning and acquisition circuit is connected to a data processing unit, wherein both the fiber optical Fabry-Perot pressure sensor at high-pressure-side and the fiber optical Fabry-Perot pressure sensor at low-pressure-side are fixedly connected to the test tube through an auxiliary connecting device which is designed as a hollow cylinder, and the auxiliary connecting device comprises a fixed connection structure, a sealing structure and a gland packing layer, which are successively arranged from outside to inside.

2. The fiber optical Fabry-Perot flow test device with local bending diversion structure according to claim 1, wherein both the fiber optical Fabry-Perot pressure sensor at high-pressure-side and the fiber optical Fabry-Perot pressure sensor at low-pressure-side are packaged by laser welding, and for those sensors, a Fabry-Perot cavity is formed from monocrystalline silicon wafers and glass sheets having etched pits thereon.

3. A test method performed by using the fiber optical Fabry-Perot flow test device with local bending diversion structure according to claim 2, comprising the following steps of:
(1) connecting the fiber optical Fabry-Perot flow test device with local bending diversion structure to a pipe to be tested, turning on the first light source and the second light source, and allowing a fluid to form a high pressure concentrated area and a low pressure concentrated area on an outer side and an inner side of the arc-shaped section when flowing through the arc-shaped section in the middle portion of the test tube;
(2) sensing a high pressure signal and a low pressure signal in the arc-shaped section in the middle portion of the test tube by the fiber optical Fabry-Perot pressure sensor at high-pressure-side and the fiber optical Fabry-Perot pressure sensor at low-pressure-side, respectively, the high pressure signal and the low pressure signal directly acting on the diaphragms of the fiber optical Fabry-Perot pressure sensor at high-pressure-side and the fiber optical Fabry-Perot pressure sensor at low-pressure-side, respectively, so that a length of each Fabry-Perot cavity changes, both high pressure information and low pressure information being implied in an optical path difference in the respective reflected light signal variations;
(3) transmitting a reflected light signal at high pressure side into the first optical signal demodulation system through the first circulator, transmitting a reflected light signal at low pressure side into the second optical signal demodulation system through the second circulator, and demodulating the reflected light signals containing different optical path difference information into spatial low-coherence interference patterns by the first optical signal demodulation system and the second optical signal demodulation system, respectively;
(4) receiving the spatial low-coherence interference pattern from the first optical signal demodulation system by the first linear array CCD camera, and converting the pattern into a high-pressure-side electrical signal, and receiving the spatial low-coherence interference pattern from the second optical signal demodulation system by the second linear array CCD camera, and converting the pattern into a low-pressure-side electrical signal; and
(5) transmitting the high-pressure-side electrical signal and the low-pressure-side electrical signal to the data processing unit through the signal conditioning and acquisition circuit; calculating an absolute phase difference $\Delta \alpha$ s between the high pressure side and the low pressure side, and then calculating an absolute pressure difference $\Delta P$ between the high pressure side and the low pressure side according to the formula $$\Delta P = \Delta \alpha_s \frac{16El^3}{3\left(\frac{D}{2}\right)^4 (1-v^2)} \left(\frac{1}{-2k_s}\right);$$

wherein, E is an elastic modulus of the diaphragm material, D is the diameter of the diaphragm, l is the thickness of the diaphragm, v is a Poisson's ratio and k s is the wave number at a point s; and finally, calculating a fluid flow Q in the pipe to be tested according to a forced vortex theory $$Q = \frac{8 \cdot \beta \pi A^2}{D^2} \sqrt{\frac{El^3 R}{-3Ak_s \rho (1-v^2)}} \Delta \alpha_s,$$

wherein, $\beta$ is a correction factor, R is the curvature radius of the arc-shaped section in the middle portion of the test tube, A is the inner diameter of the arc-shaped section in the middle portion of the test tube, and $\rho$ is the fluid density.

4. The fiber optical Fabry-Perot flow test device with local bending diversion structure according to claim 1, wherein the arc-shaped section in the middle portion of the test tube has an angle of bending ranging from 30° to 360° and a curvature-to-diameter ratio ranging from 1.1 to 2.5.

5. A test method performed by using the fiber optical Fabry-Perot flow test device with local bending diversion structure according to claim 4, comprising the following steps of:
(1) connecting the fiber optical Fabry-Perot flow test device with local bending diversion structure to a pipe to be tested, turning on the first light source and the second light source, and allowing a fluid to form a high pressure concentrated area and a low pressure concentrated area on an outer side and an inner side of the arc-shaped section when flowing through the arc-shaped section in the middle portion of the test tube;
(2) sensing a high pressure signal and a low pressure signal in the arc-shaped section in the middle portion of the test tube by the fiber optical Fabry-Perot pressure sensor at high-pressure-side and the fiber optical Fabry-Perot pressure sensor at low-pressure-side, respectively, the high pressure signal and the low pressure signal directly acting on the diaphragms of the fiber optical Fabry-Perot pressure sensor at high-pressure-side and the fiber optical Fabry-Perot pressure sensor at low-pressure-side, respectively, so that a length of each Fabry-Perot cavity changes, both high pressure information and low pressure information being implied in an optical path difference in respective reflected light signal variations;

(3) transmitting a reflected light signal at high pressure side into the first optical signal demodulation system through the first circulator, transmitting a reflected light signal at low pressure side into the second optical signal demodulation system through the second circulator, and demodulating the reflected light signals containing different optical path difference information into spatial low-coherence interference patterns by the first optical signal demodulation system and the second optical signal demodulation system, respectively;

(4) receiving the spatial low-coherence interference pattern from the first optical signal demodulation system by the first linear array CCD camera, and converting the pattern into a high-pressure-side electrical signal, and receiving the spatial low-coherence interference pattern from the second optical signal demodulation system by the second linear array CCD camera, and converting the pattern into a low-pressure-side electrical signal; and (5) transmitting the high-pressure-side electrical signal and the low-pressure-side electrical signal to the data processing unit through the signal conditioning and acquisition circuit; calculating an absolute phase difference $\Delta\alpha_s$ between the high pressure side and the low pressure side, and then calculating an absolute pressure difference $\Delta P$ between the high pressure side and the low pressure side according to the formula $$\Delta P = \Delta\alpha_s \frac{16El^3}{3\left(\frac{D}{2}\right)^4 (1-v^2)} \left(\frac{1}{-2k_s}\right);$$

wherein, E is an elastic modulus of the diaphragm material, D is the diameter of the diaphragm, l is the thickness of the diaphragm, v is a Poisson's ratio and k s is the wave number at a point s; and finally, calculating a fluid flow Q in the pipe to be tested according to a forced vortex theory $$Q = \frac{8 \cdot \beta \pi A^2}{D^2} \sqrt{\frac{El^3 R}{-3Ak_s\rho(1-v^2)} \Delta\alpha_s} ,$$

wherein, β is a correction factor, R is the curvature radius of the arc-shaped section in the middle portion of the test tube, A is the inner diameter of the arc-shaped section in the middle portion of the test tube, and ρ is the fluid density.

6. The fiber optical Fabry-Perot flow test device with local bending diversion structure according to claim 1, wherein the length of the linear sections at two ends of the test tube is designed to be 5 to 10 times of the diameter of a pipe to be tested.

7. A test method performed by using the fiber optical Fabry-Perot flow test device with local bending diversion structure according to claim 1, comprising the following steps of:

(1) connecting the fiber optical Fabry-Perot flow test device with local bending diversion structure to a pipe to be tested, turning on the first light source and the second light source, and allowing a fluid to form a high pressure concentrated area and a low pressure concentrated area on an outer side and an inner side of the arc-shaped section when flowing through the arc-shaped section in the middle portion of the test tube;

(2) sensing a high pressure signal and a low pressure signal in the arc-shaped section in the middle portion of the test tube by the fiber optical Fabry-Perot pressure sensor at high-pressure-side and the fiber optical Fabry-Perot pressure sensor at low-pressure-side, respectively, the high pressure signal and the low pressure signal directly acting on the diaphragms of the fiber optical Fabry-Perot pressure sensor at high-pressure-side and the fiber optical Fabry-Perot pressure sensor at low-pressure-side, respectively, so that a length of each Fabry-Perot cavity changes, both high pressure information and low pressure information being implied in an optical path difference in the respective reflected light signal variations;

(3) transmitting a reflected light signal at high pressure side into the first optical signal demodulation system through the first circulator, transmitting a reflected light signal at low pressure side into the second optical signal demodulation system through the second circulator, and demodulating the reflected light signals containing different optical path difference information into spatial low-coherence interference patterns by the first optical signal demodulation system and the second optical signal demodulation system, respectively;

(4) receiving the spatial low-coherence interference pattern from the first optical signal demodulation system by the first linear array CCD camera, and converting the pattern into a high-pressure-side electrical signal, and receiving the spatial low-coherence interference pattern from the second optical signal demodulation system by the second linear array CCD camera, and converting the pattern into a low-pressure-side electrical signal; and (5) transmitting the high-pressure-side electrical signal and the low-pressure-side electrical signal to the data processing unit through the signal conditioning and acquisition circuit; calculating an absolute phase difference $\Delta\alpha_s$ between the high pressure side and the low pressure side, and then calculating an absolute pressure difference $\Delta P$ between the high pressure side and the low pressure side according to the formula $$\Delta P = \Delta\alpha_s \frac{16El^3}{3\left(\frac{D}{2}\right)^4 (1-v^2)} \left(\frac{1}{-2k_s}\right);$$

wherein, E is an elastic modulus of the diaphragm material, D is the diameter of the diaphragm, l is the thickness of the diaphragm, v is a Poisson's ratio and k s is the wave number at a point s; and finally, calculating a fluid flow Q in the pipe to be tested according to a forced vortex theory $$Q = \frac{8 \cdot \beta \pi A^2}{D^2} \sqrt{\frac{El^3 R}{-3Ak_s\rho(1-v^2)} \Delta\alpha_s} ,$$

wherein, $\beta$ is a correction factor, R is the curvature radius of the arc-shaped section in the middle portion of the test tube, A is the inner diameter of the arc-shaped section in the middle portion of the test tube, and $\rho$ is the fluid density.

\* \* \* \* \*